Mar. 6, 1923.
E. E. THRASHER
1,447,739
COMBINED CUSHION AND PNEUMATIC TIRE AND RIM THEREFOR
Filed Apr. 12, 1922
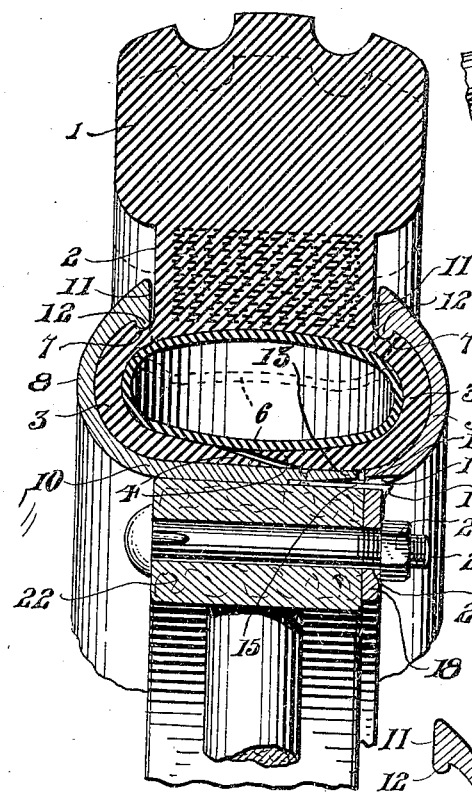
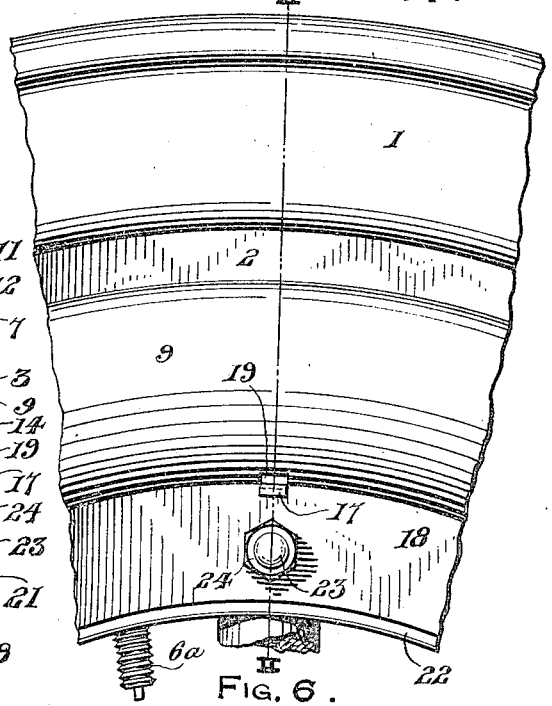
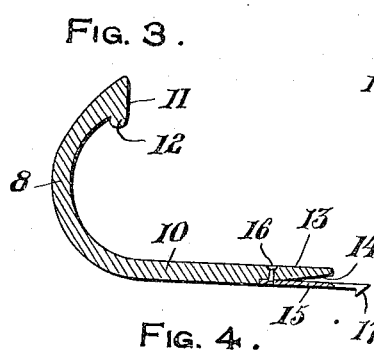
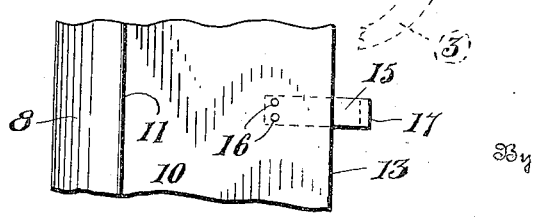
Inventor
Elmer E. Thrasher
By F. N. Bryant,
Attorney Patented Mar. 6, 1923.

1,447,739

UNITED STATES PATENT OFFICE.

ELMER E. THRASHER, OF CUMBERLAND, MARYLAND.

COMBINED CUSHION AND PNEUMATIC TIRE AND RIM THEREFOR.

Application filed April 12, 1922. Serial No. 551,974.

*To all whom it may concern:*

Be it known that I, ELMER E. THRASHER, a citizen of the United States of America, residing at Cumberland, in the county of Allegany and State of Maryland, have invented certain new and useful Improvements in Combined Cushions and Pneumatic Tires and Rims Therefor, of which the following is a specification.

This invention relates to certain new and useful improvements in combined cushion and pneumatic tires and has particular reference to the construction of a tire of this type wherein a relatively large solid block or tread portion is provided with a socket or channel adjacent the inner side thereof for the reception of a pneumatic inner tube.

The primary object of the invention resides in the provision of a combined cushion and pneumatic tire wherein the solid block or tread portion is positioned outwardly of a sectional rim supporting the tire while the pneumatic inner tube positioned in the tire, occupies a position entirely enclosed by the sectional rim.

The invention further embodies in a tire of the type above set forth, a sectional rim of the clincher type having the inner sides thereof interlockingly connected, and secured to the felly of a wheel of either the spoke or disk type, the pneumatic tube of the tire being disposed entirely within the sectional rim and spaced from the tread of the solid portion of the tire to prevent punctures of the tube and blowouts of the tire.

With these general objects in view and others that will appear as the nature of the invention is better understood, the same consists in the novel construction, combination and arrangement of parts hereinafter more fully described, illustrated in the accompanying drawings, and pointed out in the appended claims.

In the drawings:

Figure 1 is a fragmentary side elevational view of a combined cushion and pneumatic tire, and rim constructed in accordance with the present invention.

Figure 2 is a cross-sectional view taken on line II—II of Figure 1 showing the combined cushion and pneumatic tire, with the pneumatic section confined within the sectional rim supported on a wheel felly and further showing by dotted lines the position assumed by the tire when under compression, Figure 3 is a cross-sectional view of one of the rim sections showing the spring fingers carried by one section for engaging the other rim section, Figure 4 is a fragmentary plan view of the rim section shown in Figure 3, Figure 5 is a cross-sectional view of the other rim section or clamping ring.

Figure 6 is a fragmentary side elevational view of the rim section or clamping ring as shown in Figure 5, and Figure 7 is a fragmentary cross-sectional view of a portion of the tire showing the inner side thereof split at its center line, and shown in open position by dotted lines for receiving the pneumatic inner tube.

Referring more in detail to the accompanying drawing, there is illustrated a combined cushion and pneumatic tire supported in a sectional rim that is mounted upon and secured to the felly of a wheel, the tire embodying a solid block or tread portion 1, having a reduced intermediate neck 2 which may be reinforced by fabric or cloth as shown in Figure 1, while the inner end of the neck 2, as shown in Figures 2 and 7, carries reversely curved side section 3 having overlapping ends 4 at the central circumferential line of the tire. The side sections 3 form a channel or pocket 5 for the reception of a pneumatic inner tube 6 of substantially oval formation in cross section, when under inflation as shown in Figure 2, the same being provided with the usual inflating valve stem $6^a$ for purposes presently to appear, the outer sides of the side sections 3 at their point of connection with the reduced tire neck 2 are provided with annular grooves or channels 7 as shown in Figure 2.

The sectional rim for supporting the combined cushion and pneumatic tire is of the clincher type and embodies sections 8 and 9, the rim section 8 having a flat annular felly engaging band 10, the upper end of the curved side of the section 8 being provided with a relatively wide flat wall 11 carrying a bead 12 at the lower end thereof for engagement in the groove 7 at the point of connection between the tire neck 2 and the side section 3, as shown more clearly in Figures 2 and 3. The free edge 13 of the rim section 8 is beveled upon the lower side thereof as at 14 to provide a space for a spring finger 15 secured as at 16 to the beveled edge of the rim band, the finger 15 being provided upon the outer end thereof with a hook 17.

The companion rim section 9 is provided upon the upper edge thereof with a flat wall 11 and depending bead 12 for cooperation with the tire, as described in connection with the rim section 8 as shown in Figure 3, the lower edge of the curved side of the section 9 carrying an annular flange 18 provided with spaced openings 19 defining shoulders 20 for the reception of the spring fingers 15, and for engagement by the finger hooks 17 carried by the spring fingers. The flange 18 is provided with a series of spaced openings 21 the flange 18 being positioned for engagement with the adjacent side of a wheel felly 22 with bolts 23 passing through the felly and flange openings 21 for the reception of the retaining nuts 24 as shown in Figures 1 and 2. While the tire is illustrated as being mounted upon a wheel of the spoke type, it is understood that the same may as readily be associated with disk or wire wheels.

From the above detailed description of the device it is believed that the construction and operation thereof will at once be apparent, it being noted that the tube 6 is positioned in the tire channel 5, when the tire is removed from the sectional rim, by spreading apart the side sections 3 of the tire as shown in Figure 7 by dotted lines, and when so disposed, the pneumatic section of the tire is positioned in the rim section 8. If desired, the rim section 8 and tire supported thereby may be positioned on the felly 2, or if preferred, the other rim section or clamping ring may be mounted into engagement with the rim section 8 to cause the spring fingers 15 to be projected through the openings 19 in the rim section 9 with the hooks 17 engaging the opening shoulders 20 to retain the sections in assembled formation, the bolts 23 passing through the openings 21 in the flange 18 of the rim section 9 securely holding the sectional rim and tire on the felly 22 of the wheel. When the tire 1 is under compression, the neck portion 2 thereof moves inwardly of the rim sections 8 and 9 to compress the inner tube 6 and tire section 1 as shown by dotted lines in Figure 2, the relatively wide flattened walls 11 of the rim sections 8 and 9 forming a guide for the neck 2 of the tire and to prevent lateral creeping or shifting movement of the tire, relative to the rim, the rim bead 12 extending into the tire grooves 7 as shown in Figure 2 will effectively retain the tire in its proper position on the rim sections 8 and 9. In removing the tire from the felly, the bolts 23 may be disengaged from the rim section 9 and the spring fingers 15 will then be released to permit the removal of the rim section or clamping means 9.

By positioning the inner tube 6 within the sectional rim the same is fully protected from injury, while in case of emergency, the relatively large cushion portion of the tire will function should damage result to the tube.

What is claimed as new is:—

1. In a tire of the type described, a combined cushion and pneumatic tire, reversely curved sides carried by the inner edge of the cushion portion of the tire defining a channel for the pneumatic portion of the tire, a reduced neck portion between the tire tread and curved sides, a sectional rim inclosing the pneumatic portion of the tire, the outer edges of the rim sections having flattened faces engaging the opposite sides of the reduced neck of the tire to guide the movements of the tire relative to the rim, and means for preventing lateral creeping movements of the tire.

2. In a tire of the type described, a combined cushion and pneumatic tire, reversely curved side sections carried by the inner edge of the cushion portion of the tire defining a channel for the reception of an inner tube, a reduced neck portion between the tire tread and side sections, a sectional rim inclosing the pneumatic portion of the tire, the outer edges of the rim sections having flattened faces engaging the opposite sides of the reduced neck of the tire to guide the movements of the tire relative to the rim, said neck having annular grooves therein at the point of connection with the side sections, and annular beads depending from the outer ends of the rim sections extending into said channels to prevent lateral creeping movements of the tire.

In testimony whereof I affix my signature.

ELMER E. THRASHER.